(12) United States Patent
Teodorescu et al.

(10) Patent No.: US 11,835,401 B2
(45) Date of Patent: Dec. 5, 2023

(54) SENSORS FOR PRESSURE, FORCES, AND COUPLES

(71) Applicants: Mike Horia Mihail Teodorescu, Cambridge, MA (US); Horia-Nicolai Teodorescu, Iasi (RO); Marius Gheorghe Hagan, Valenii Somcutei (RO)

(72) Inventors: Mike Horia Mihail Teodorescu, Cambridge, MA (US); Horia-Nicolai Teodorescu, Iasi (RO); Marius Gheorghe Hagan, Valenii Somcutei (RO)

( * ) Notice: Subject to any disclaimer, the term of this patent is extended or adjusted under 35 U.S.C. 154(b) by 11 days.

(21) Appl. No.: 17/897,112

(22) Filed: Aug. 26, 2022

(65) Prior Publication Data

US 2023/0077179 A1   Mar. 9, 2023

(51) Int. Cl.
 *G01L 1/14* (2006.01)
 *G01L 9/00* (2006.01)
 *G01L 19/06* (2006.01)
 *G01L 3/10* (2006.01)

(52) U.S. Cl.
 CPC .............. *G01L 1/142* (2013.01); *G01L 3/10* (2013.01); *G01L 9/0072* (2013.01); *G01L 19/069* (2013.01)

(58) Field of Classification Search
 CPC ......... G01L 1/142; G01L 3/10; G01L 9/0072; G01L 19/069
 See application file for complete search history.

(56) References Cited

U.S. PATENT DOCUMENTS

| | | | | |
|---|---|---|---|---|
| 4,706,505 A * | 11/1987 | King | ................ | G01L 5/161 73/862.041 |
| 5,813,280 A * | 9/1998 | Johnson | ................ | G01L 1/255 73/761 |
| 8,598,893 B2 * | 12/2013 | Camus | ................ | G01L 1/142 324/661 |
| 10,386,251 B2 * | 8/2019 | Klemm | ................ | G01L 1/20 |
| 11,589,764 B1 * | 2/2023 | Davis | ................ | A61B 5/0261 |
| 2022/0187971 A1 * | 6/2022 | Aloui | ................ | G01L 5/162 |
| 2022/0256272 A1 * | 8/2022 | Feng | ................ | G06F 3/165 |

FOREIGN PATENT DOCUMENTS

| | | | | |
|---|---|---|---|---|
| DE | 102012224122 A1 * | 6/2014 | ........ | G01L 1/146 |
| EP | 2957880 B1 * | 4/2018 | ........ | G01L 1/042 |
| GB | 2584088 | * 11/2020 | | |

* cited by examiner

*Primary Examiner* — Octavia Davis Hollington

(57) ABSTRACT

The invention relates to a pressure sensor, forces after one to three directions, normal to the sensor plane and tangential to the sensor plane, as well as torques, the sensor being based on the variation of reactive or mixed impedances when applying normal forces or pressure and/or tangential forces or torques on the sensor structure. The sensor has a structure that includes a closed and watertight space, so that the behavior of the sensor is little or not affected by varying environmental conditions.

21 Claims, 12 Drawing Sheets

(a)

(b)

(a)

(b)

SENSORS FOR PRESSURE, FORCES, AND COUPLES

CROSS-REFERENCE TO RELEATED PATENT APPLICATION

This application claims the benefit of priority to Romanian Patent Application Number A/00306/2022 filed Jun. 7, 2022. The entire content of this identified application is incorporated herein by reference.

References cited, which include patents, patent applications, and non-patent literature, may be discussed in the description. Such references are provided only to clarify the description and terminology and is not an admission that such references represent "prior art" to this description.

BACKGROUND OF THE INVENTION

1. Field of Invention

The invention refers to sensors for pressure, forces and couples, based on impedancemetric (impedance and variable impedance) measuring elements, where the sensors have a high immunity to external electric fields and to the humidity of the environment, which properties allow the realization of sensors with good accuracy, simultaneously ensuring the possibility of small sensor sizes. Such sensors may have medical applications, such as gait analysis, personal health measurement devices, or prosthetics, aeronautical and aerospace applications, as well as industrial, agricultural and harsh environment applications. The use of these example application fields is illustrative only and is not meant to limit the scope of the sensors disclosed herein.

2. Discussion of the Background

The technical problem that the invention solves consists in the creation of pressure, force and/or torque sensors, based on impedancemetric measuring elements, with increased immunity to the conditions of the environment, able to measure forces, pressures and couples with good precision, simultaneously ensuring small sensor thicknesses, good reliability and low cost.

The disclosed sensors can take over and measure the pressure in the preferential direction normal on the main plane of the structure; also, in various embodiments, they can measure forces after one to three directions, namely normal on the sensor plane and tangential to the sensor plane, as well as torques in the sensor plane.

Sensors for forces, pressure and/or couples that are working in unfavorable environments with large external electric or magnetic fields and high humidity, moreover, often subjected to external forces, are necessary in various fields, such as construction, transport, and agricultural machinery. In such applications, external electromagnetic fields are often unknown and can be highly variable, and humidity can reach 100% RH, conditions in which known sensors cannot work, or have large errors, or have poor reliability, are not miniaturizable, have a high cost, and may require additional costly or bulky protections. Also, many pressure or force sensors, such as the piezoresistive sensors used un gait measurements, have the drawback of not allowing the simultaneous normal and shear stress measurement, see for example Giacomozzi and Macellari (1997), and Satu and Jukka (2014). The force, pressure and/or torque sensors described in the invention solve these problems by using a specific structure, impedance measuring elements with configurations adapted to the structure and measuring function, deformable elements with complex structure, as well as simple and efficient protections.

There are numerous applications where the measurement at the same time of axial forces, tangential (shear) forces and couples of forces are needed. Such applications include human gait analysis, where all three types of measurements are needed, while no sensor today is able to perform them, rubber dumpers used in agricultural and transportation vehicles, and weight measurements, where any non-horizontality of the measuring platform may introduce errors and may generate tangential forces and couples. For such applications, a single sensor that is able to measure all the three types of parameters would have advantages. Further, application fields where extremely light or small sensors are necessary, or where sensors are subject to extreme conditions such as extreme humidity, heat, or radiation, may also be of interest for the disclosed invention.

Capacitive pressure and/or force sensors incorporating electrostatic shields are known; such sensors are described in U.S. Pat. No. 8,516,884, Stein, et al, 2013; U.S. Pat. No. 7,171,856, Koike, et al., 2007; U.S. Pat. No. 4,204,244, Ho, 1980; U.S. Pat. No. 10,267,700, Teipen, et al., 2019; U.S. Pat. No. 10,892,229, Hooper, et al., 2021; U.S. Pat. No. 10,495,535, Zheng, 2019. Inductive pressure and/or force sensors, incorporating magnetic shields, are also known; such sensors are described, for example, in U.S. Pat. No. 4,157,530, Merz, Jun. 5, 1979. Some of these sensors also include means for sealing the sensor. An elementary complex impedance proximity sensor has been disclosed in U.S. Pat. No. 6,011,477 (Teodorescu and Mlynek, 2000). However, such sensors have one or several drawbacks already mentioned.

The present application brings innovative aspects on several levels, including: i) at the level of functional capabilities; ii) at the level of structure; iii) at the level of the measuring elements and of their combinations. The novel functional capabilities include the simultaneous measurement of axial and/or tangential forces, and/or of torque in the plane of the sensor, as well as potential for improved accuracy, by using complex impedance type sensors, with the resistive, capacitive and inductive components of the impedances dependent on the changes in geometry and the impedance components having a frequency dependence that changes when the geometry of the sensing elements is modified by the said forces and torques. The innovations at the level of the sensor structure include a water-tight structure; new geometrical configurations comprising the elastic elements; the use of electrostatic and/or magnetic shields; innovations in the shape and type of the measuring elements and in their mutual geometrical relation; the use of annex circuitry embedded in the sensor; the combination of massive elastic elements with a thick membrane able to take over shear forces beyond axial pressure; innovative shapes for the shields; and the use of novel combinations of measuring elements disposed in specific geometric arrangements in relation with the structure of the sensor. At the level of the measuring elements and of their combinations, the novelties include new configurations and types of measuring elements; novel combinations of measuring elements disposed in specific geometries in relation with the structure of the sensor; when an elastic membrane is employed, the use of several measuring elements on the membrane, where the measuring elements determine the non-symmetrical deformations of the thick membrane due to shear stresses; the use of capacitors with interdigital electrodes (comb capacitors) for measuring shear and torque.

Compared with the state of the art, the sensors according to the invention have the following advantages: the sensors use reactive impedance measuring elements; the sensors have increased immunity to environmental conditions; these sensors are able to measure forces, pressures and torques with good accuracy; also, the sensors can be made of small package sizes, including extremely small thickness such as composite films, or dimensions which conform natural curvatures such as foot arch (for sensors included in shoe inserts where user comfort is of the essence), ankle or knee curvature which requires flexible sensors, or other sensors shaped based on user natural joint curvatures for sensors used in personal health measurement applications. Sensors with the benefits disclosed herein may also be useful for biological enhancement applications such as controlling exoskeletons. Such sensors may also be beneficial in the optimization of prostheses.

Throughout the description and in the claims, notions and notations are used with the following definitions: elastic element is a structural element of a material which, within the prescribed limits of operation, has essentially elastic deformations; ground electrode—electrode continuously at a reference potential (also called ground) for electrical circuits; active electrode-electrode that may have a variable or different potential from the reference potential (ground); impedancemetric measuring element is an electrical circuit element designed to convert a variation of a quantity (dimensions, angles, distances) or geometric shapes into a variation of an electrical quantity of the impedance type, where the impedance can be capacitance, resistance, or electrical inductance, or any combination of them, including distributed or coupling impedances; in addition, the resistive, capacitive and inductive components of the impedances dependent on the changes in geometry, moreover have a frequency dependence that changes when the geometry of the sensing elements is modified by the said forces and torques, thus making useful the measurement at a multitude of frequencies (hence the name impedancemetric); cellular (or reticular) material (foam)—material with closed inclusions, typically air; spongy material—material with inclusions, typical air, with open inclusions; C denotes electrical capacity; L denotes inductance; inductive network—conductive network of mesh type, with electrically connected elements, according to the usual name in the literature ("inductive mesh"); capacitive mesh—a structure consisting of conductive elements without an electrical connection between them ("capacitive mesh" is the usual name in the literature); thick membrane is defined in relation with the range of forces, pressure, and/or torques to be measured; the combination of the thickness and elasticity of a thick membrane should allow the membrane to have good sensitivity, behave elastically, without plastic deformations, as well as should prevent wrinkle-like local deformations under tangential forces in the desired range. Hereinafter, electrical impedance circuit elements used for measurement purpose will be referred to as impedancemetric measuring elements, measurement impedance elements, or simply impedance elements.

BRIEF DESCRIPTION OF THE DRAWINGS

In connection with FIGS. 1-12, the embodiments of the invention and the related operating principles are set forth below. None of the figures is to scale.

DETAILED DESCRIPTION

The terms used in this specification have the ordinary meanings in the art; in cases of conflicting definitions, the use in the present description prevails. Synonyms or alternative language may be used interchangeably for the terms present in the description and do not have any special significance. The use of any examples in this description is meant to be illustrative only and does not limit the scope of the embodiments herein. Numbering is used to illustrate components in drawings and is not meant to impose any limitations on the components described.

In essence, the sensor consists of an inhomogeneous elastic element which may consist of two or more homogeneous or inhomogeneous elastic elements that allow compression or elongation deformations on the sensor axis, tangential shear and torsional deformations, shielding elements, measurement impedance elements capable of determining at least one of these types of deformations, as well as annex circuits related to impedance measuring elements. The annex circuits preferably are able to operate at least at two significantly different frequencies such as to ensure the determination as different values the capacitive, inductive and resistive parts of the impedances and, at the same time, to correct errors produced in a single determination of the capacitive, inductive and resistive parts of the impedances, whereas the change in impedances gauges the change in the geometry of the sensor structure and thus allows the indirect determination of the pressure, forces or torque exerted on the sensor. These determinations may be performed by further annex computation circuitry included in the sensor or placed outside the sensor.

Figure 1:
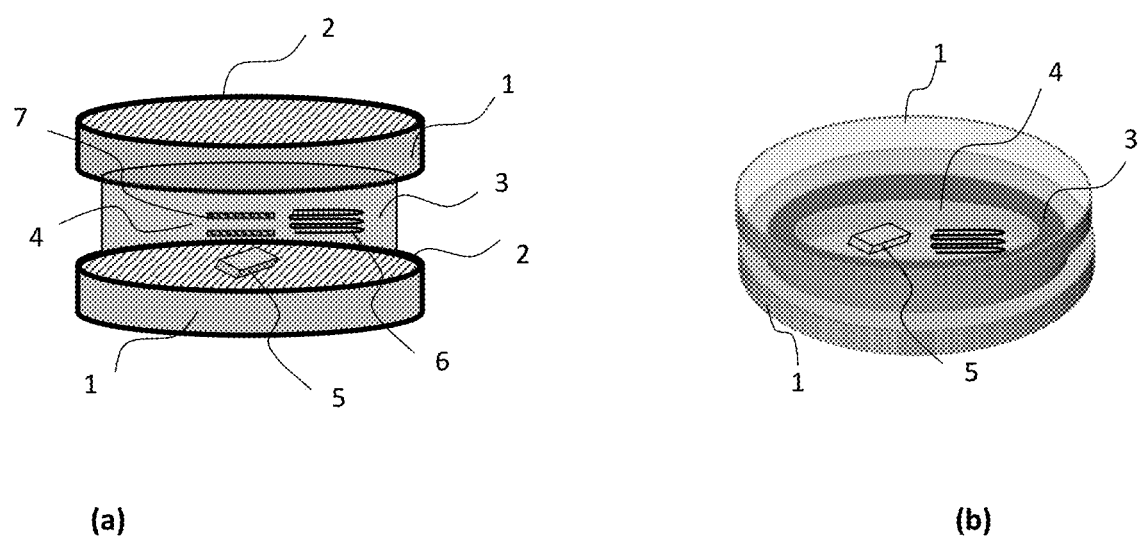
FIG. 1(a), (b)—General outline of the structure of the sensor with dielectric elastic material without inclusions.

In a non-limiting embodiment, described in connection with FIG. 1 (a) and FIG. 1 (b), the structure includes one or more supports 1, essentially parallel plane, in the form of plates or membranes, or combined plate and membrane, supports which take over the pressure, forces and/or torque, one or more electrostatic or electromagnetic screens 2, which at least partially cover the two supports inside or outside, one or more main elastic elements 3, typically insulators, which are placed essentially between the supports and hermetically close a space together with the supports 4 in which there are electronic measuring circuits 5, electrical impedance circuit elements of the electrical impedance type or parts 6 of such elements, impedance elements which have the role of measuring. Elastic elements and supports make a tight contact, preserving tightness when the elastic elements or supports deform within predetermined limits. Due to the shielding and the watertight structure, in zone 4 the effects of the external environment are not transmitted or are transmitted much reduced; thus, the measuring elements and the related circuits are protected from external effects such as electromagnetic disturbances and humidity. The space 4 or part of it may be filled with a gaseous medium, including air, or may even be the mass of the elastic element 3, or it may be filled with a medium with high elasticity, so that the Young's modulus is smaller than that of the elastic elements proper. Elastic elements in space 4, when they differ from the main elastic element, also play the role of secondary elastic elements in the formation of the structure; even the gas enclosed in that space plays this role. The main elastic element 3 can be annular, as in FIG. 1 (b). If the space 4 is filled with an elastic material, the impedance electrical circuit elements 6 and the auxiliary electrical circuits 5 must withstand the forces to which they are subjected to the deformation of the respective elastic element; also, their electrical connections must be sufficiently elastic to withstand the deformations of the elastic element.

The assembly of the supports 1 and the elastic elements 3 form the basic structure of the sensor, which structure is deformed under the influence of external pressure or forces. The deformations of the structure are measured by an electrical circuit element of the electrical impedance type, or by an assembly of such elements, in conjunction with ancillary circuits. Electrical circuit elements of the electrical impedance type 6 may be reactive, of the capacitance or inductance type, or may be combined, of the LC, RC, LC or RLC type, the value of at least one of the impedance components being modified when the structure is deformed under pressure or external forces. The attached circuits are preferably embedded in the sensor structure.

The structure preferably has an axial symmetry, with the axis of symmetry perpendicular, in the absence of external forces, on the plane-parallel supports 1, the supports being preferably circular to take equally the tangential forces in any direction as well as the torques applied anywhere on supports. The sensor takes over the normal axial pressures and forces on the surface of the supports, and the tangential forces are taken parallel to the surface of the supports. Axial symmetry is useful to simplify the measurement of tangential forces in any direction as well as torques. Alternatively, the supports may be of a certain shape, for example polygonal, but the set of elastic elements has an axial symmetry, which ensures that the tangential forces and torques in the same direction are taken up equally.

In a non-limiting embodiment, not only the space 4 but also the annular main elastic elements 3 can include in their mass (embedded) impedance measuring elements. In general, in order to detect deformations of the structure, component parts of the impedance measuring elements are distributed between the support layers, or between one of the support layers and the elastic medium, or between one of the support layers and the interior space 4, or in other such combinations. For example, an electrode of a capacitive impedance measuring element is placed on a support, and the second electrode is placed on the second outer layer of the support type or in the mass of the elastic layer. Similarly, an inductive impedance measuring element, such as a coil, may be placed on a support layer or in the empty space 4, while a corresponding magnetic core or other coupled coil may be placed on the second outer support-type layer, or in the mass of the elastic layer. Further on, a coil of an inductive impedance measuring element using coupled coils may be placed in the empty space 4, while a second coil may be embedded in the elastic element.

Ferromagnetic core layers for some inductive measuring impedance elements, impedance measuring elements or electrodes 7 of capacitive or mixed impedance elements, magnetic layers acting as permanent magnets, and/or other elements can be positioned on the supports or in the mass of the elastic elements. such as sensor circuits and/or power supply circuits.

In a non-limiting embodiment, one of the supports is a thin or thick metal membrane or plate or a thin or thick insulating membrane or plate covered with a conductive layer acting as a screen and which can also act as a passive electrode. In order to be able to take up torques and tangential forces, the membrane or thin plate may have a rigid frame.

Figure 2:
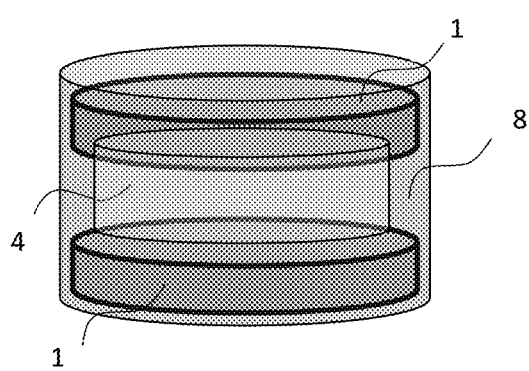
FIG. 2—General outline of the structure of the sensor with dielectric elastic material with empty space (air) type inclusion.

In another non-limiting embodiment, described in connection with FIG. 2, the main elastic element 4 is between the supports, and they are hermetically closed on the edges by another elastic element, outer, 8 which partially or completely encloses the supports, ensuring the tightness of the structure. The outer elastic element 8 also plays the role of the main elastic element if it contributes significantly to the rigidity of the structure. In this case, the outer elastic element can also act as a screen, if it is made of a conductive material and is coupled to the reference potential.

The elastic elements can be made of a homogeneous elastic material, of the elastomer type, or an elastic material reinforced with fibers, nets, or springs in order to reduce its elasticity, in order to take over high forces or pressures. When one or more secondary elastic elements are inhomogeneous, parts thereof near the surfaces on which the pressure is applied, forces or torques can be made of high hardness and thus can themselves constitute the supports of the structure, and on these external flat surfaces, or immediately in their vicinity, metallization, electrical or magnetic shields, and other sensor elements, such as magnets, may be deposited or embedded.

Figure 3:
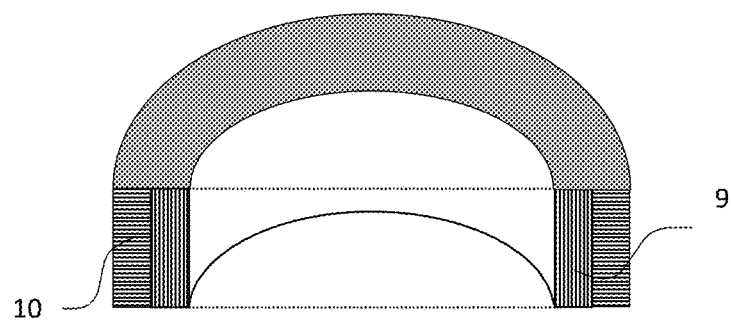
FIG. 3—General outline of the section by the structure of an elastic ring with two layers, one of which is insulating and one conductive.
Figure 4:
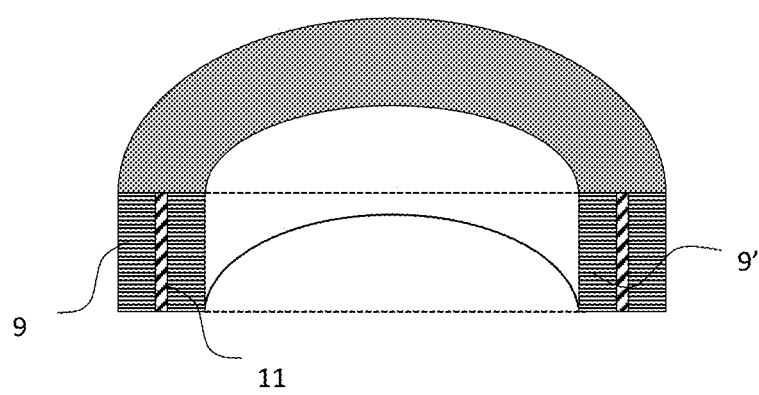
FIG. 4—(a) General sketches of the section of an elastic ring with inclusion of conductive layer for shielding. (b) Detail when the embedded conductive layer makes no contact with the upper surface of the dielectric elastic ring.
Figure 4:
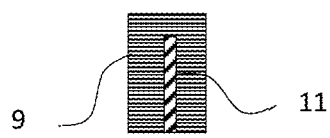

Compared to the non-limiting embodiment in FIG. 1(b), wherein the main resilient elements consist of a single annular element or in the form of a polygonal frame, in another non-limiting embodiment, described in connection with FIG. 3, the main elastic elements consist of two or more annular elements or in the form of concentric frames included inside each other, the inner elastic ring 9, or the elastic frame from inside the sensor being insulating, and the outer ring or elastic frame 10 being conductive, or with magnetic properties, the ring 10 having at the same time the role of electrostatic or electromagnetic screen. The ring or frame elastic element or elements may close together a conductive layer acting as an electrostatic shield. Those skilled in the art will appreciate that the annular member 9 may be replaced by an insulating cylinder, where the cylinder may be homogeneous or consist of several concentric layers of cylindrical walls, one or more of which may be conductive and act as an electrode or screen. Such a configuration is described in FIG. 4 (a) and FIG. 4 (b), where two annular elastic insulating elements, 9 and 9' are used, which enclose between them a thin annular conductive element 11, acting as a screen, made as a partially embedded foil or mesh in the elastic ring.

Figure 5:
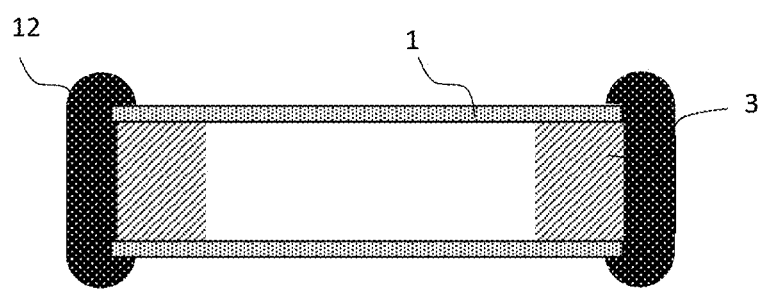
FIG. 5—General outline of the section of a sensor with sealing by outer ring made of conductive elastomer.

The person skilled in the art will also understand that the sealing of the structure can be done by a layer of conductive elastic adhesive material 12, placed on the outside of the structure, as described in FIG. 5.

The main elastic elements can be made in a compact form, with the material with uniform properties, or they can be made in the form of a non-compact structure and/or of non-uniform materials.

In all cases where the main elastic elements together with the supports seal within the sensor an airtight internal space with air or other gas, the gas acts as a secondary elastic element at the compression of the structure. For large deformations, the gas may become the main elastic element, having a nonlinear behavior, $PV=RT=$constant, so $P=RT/V=RT/hS$, where P is the pressure, V the gas volume, R the gas constant, T the absolute temperature (assumed constant), h the height of the closed air column in the sensor, and S the surface of the column. The nonlinearity comes primarily from the factor $1/h$.

A homogeneous elastic element of small section can lead, under high pressures and forces, to buckling of the elastic element or to a non-homogeneous deformation, which leads to measurement errors. On the other hand, an elastic element of large section leads to a high rigidity, therefore, consequently, to too small deformations and consequently to a reduced sensitivity. To prevent such disadvantages, in a non-limiting embodiment, the resilient element or elements may be made of a homogeneous, compact elastic material with a uniform structure, or may be in the form of elastic foams with closed air inclusions (structure called cellular), or may have a compact structure on the outside and in a spongy form (with open inclusions), of the foam type, on the inside. The spongy elastic material can be of the polymeric foam type, this type of material being sometimes also called elastic cellular plastic material. In another non-limiting embodiment of the structure of the elastic element or elastic elements, they may be made on the inside of an elastic material with a tubular hollow structure or with a network structure, which in a non-limiting embodiment may be a honeycomb structure, or other regular structure with repeated elements, wherein the structure transiting to the outside in a continuous structure and becoming continuous and watertight on the outside.

In another non-limiting embodiment, the resilient element or elements are made of a material with variable properties in its structure, made by frontal polymerization. Another method of making inhomogeneous elastic structures is by 3D printing. Another method of making inhomogeneous elastic structures is coextrusion.

Most of the above-mentioned elements change their electric properties when compressed, with their dielectric permittivity and losses changing under compression, at least because the density of the material changes; for some of these materials that exhibit anisotropy, compression may also affect anisotropy. As a consequence, the dependence of the electric properties with frequency also changes, hence the interest of performing measurements at a multitude of frequencies for deriving the deformation of the structure under external forces and torques. In addition, deformations of the structure may change the distance from an active electrode to a conductive or magnetic shield, further inducing changes in the dependence of the electric properties with frequency.

The screen or screens on one or both supports may be made as a uniform metallization of the support on the outer or inner face of the support or may be made in the form of a net, mesh, chessboard, interconnected conductive strips, or under a similar shape. One or both screens 2 on the supports 1 can also act as a ground electrode in capacitive impedance elements, can have a dissipation role to contribute to the variable resistance of an impedance element, the variability of the resistance of stones having a role in measurement, or they can simultaneously have the mentioned roles and the role of magnetic core for inductive elements when the metallization includes alloys or ferromagnetic metals.

Those skilled in the art will appreciate that various other geometries and combinations of elastic elements, ring-shaped or frame-type or other shapes corresponding to the configuration chosen for the structure, derive from the configurations described and are also subject to this description and may be used successfully. The elastic elements may be electrical isolators (dielectric), or may include magnetic compounds thus acting as magnetic shields, or may be conductive or include conductive parts, thus acting as electrodes or electrostatic shields. The elastic elements may be made of or may include parts that behave as pressure sensitive dielectrics, or pressure sensitive magnetic materials. Also, the elastic elements may include one or several pressure sensitive devices with negative resistance, such as tunnel diodes or Gunn diodes.

Figure 6:
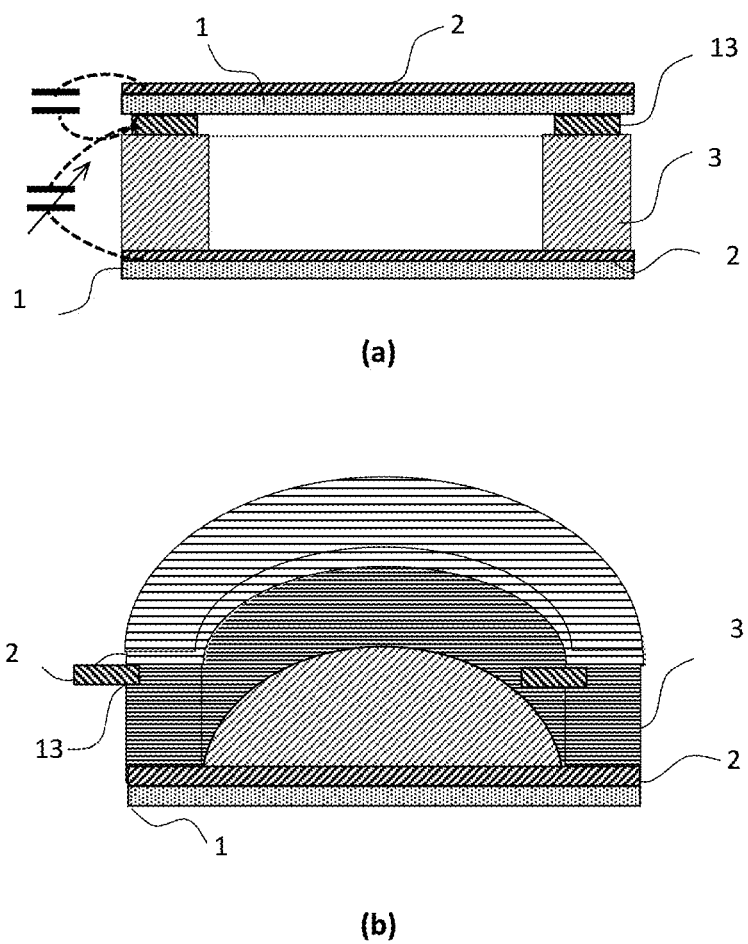
FIG. 6(a), (b)—General outline of principle of the sensor with elastic dielectric ring and annular active electrode forming capacitances with respect with the two plate ground electrodes that serve also as electrostatic shields.
Figure 7:
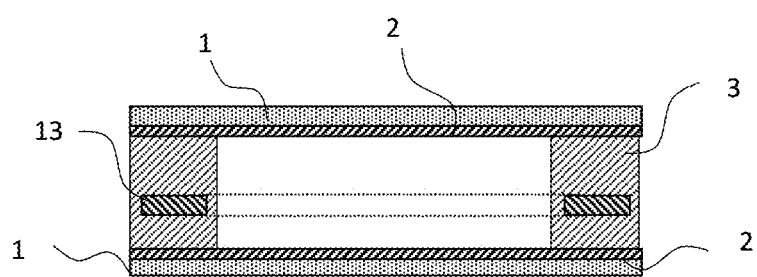
FIG. 7—General outline for section through a sensor with capacitive measuring element, with annular elastic element with embedded annular electrode.

It is further discussed in connection with FIG. 6 (a), and FIG. 6 (b), embodiments of capacitive type impedance elements according to the invention. In the case of using capacitive impedance elements to determine the deformation of the structure, an active electrode 13 can be placed on the inner surface of a support, the capacity being formed between this electrode and the two electrodes connected to ground, 2, which also act as a screen. The active electrode is completely included in the sealed and shielded space. In particular, in one embodiment, the active electrode may have a circular shape, or an annular shape, or another shape that allows the positioning of auxiliary circuit elements on one of the supports and allows the realization of other impedance measuring elements in within the structure. The active electrode can be made in the form of uniform metallization, or in the form of a multi-ring with interconnected concentric rings, or in the form of interconnected conductive bands, or in the form of a network (mesh, chessboard, etc.), the latter forms providing determination, in conjunction with one or more additional impedance metric elements, of the shear deformations of the structure. The active electrode of one or more impedance meters may have a star or polygonal shape, or a complex shape to provide and determine, in conjunction with one or more additional impedance elements, the torsional deformations of the structure. The active electrode can be made in the free space delimited by the supports and the annular elastic element, or it can be included partially or totally in the elastic element, as in FIG. 7. Also, the active electrodes 13 of the capacitive sensor can be positioned on the inside of the thick dielectric membrane 14, as in FIG. 8, while the membrane frame 15 can act as a screen. To reduce the parasitic capacity between the active electrode and a screen, the screen can be made locally, in the area of the main parasitic capacity, in the form of a net, 16, as in FIG. 9.

Similarly, when inductive impedance elements are used, they are arranged in the shielded and sealed space delimited by supports and elastic elements. When inductive impedance elements are used, they have shapes and arrangements similar to those of the active electrode of the capacitive elements described, and when inductive impedance elements with mutual coupling are used, they may have arrangements similar to those of the active electrode and a passive electrode. of a capacitive element, as described above for capacitive elements.

Figure 10:
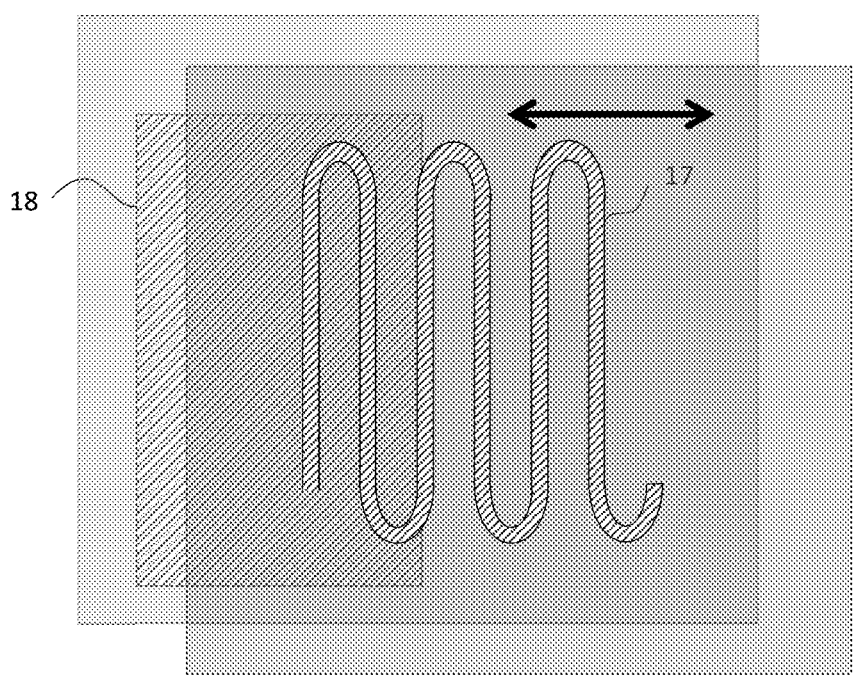
FIG. 10—General outline of principle for a measuring element with variable inductive impedance or with variable distributed elements, suitable for shear force determination.

According to the invention, capacitive or inductive impedance transducers or combinations of such side-sensitive transducers are used to determine the displacements in the structural plane as a result of the shear stress and forces in the plane of the support elements. In a non-limiting embodiment, illustrated in FIG. 10, an inductive transducer is used, which consists of an inductor 17 and a conductive layer 18 in another plane, or a magnetizable or magnetic layer so that on lateral movement the inductance changes its value or losses. In another embodiment, illustrated in FIG. 11 (a) and FIG. 11 (b), an interdigital capacitive transducer is used, with digital electrodes 19 and 19' in different planes.

Figure 11:
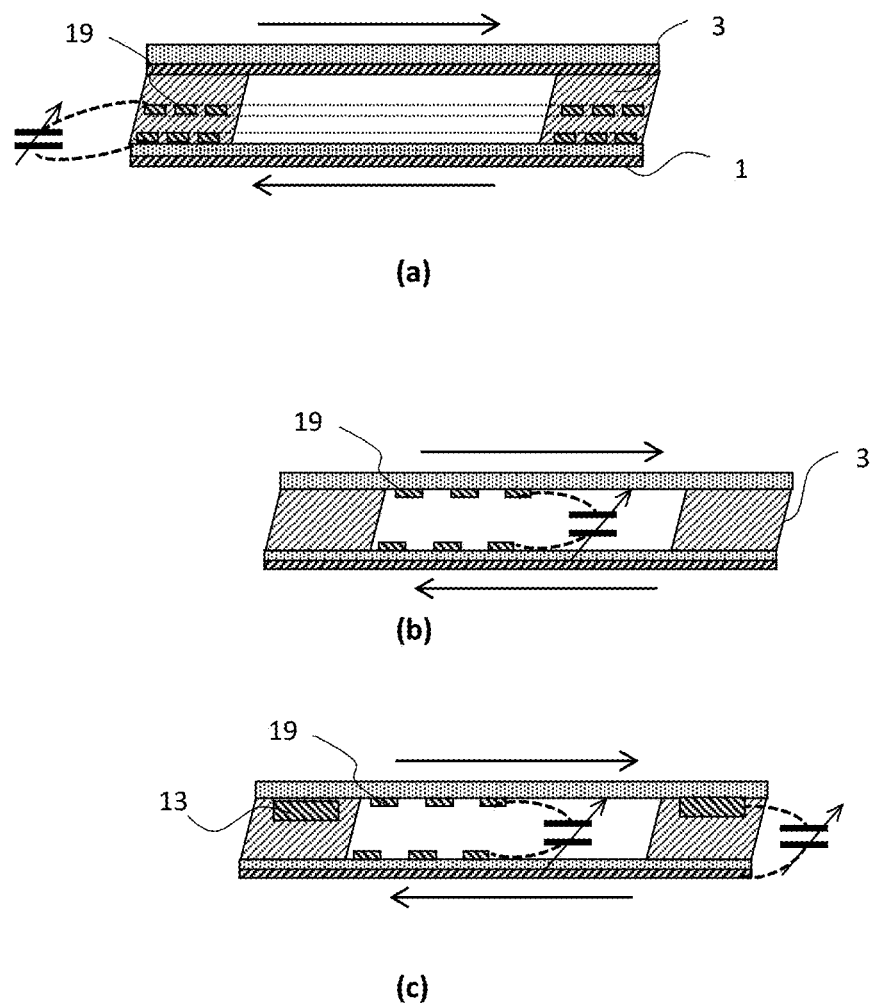
FIG. 11(a), (b)—Sketches of principle for "comb" capacitive element for determining the shear, with the variable capacitance symbol sketched between the digital electrodes and the direction of the forces acting on the two plates of the sensor; (c) Sketch of the principle for a combined sensor for normal and shear stress, corresponding to the sensing elements in FIG. 6(a) and FIG. 11(b).

In the case of rigid wall sensors, if the walls are not too thick, the lateral deformation of the structure at tangential force shall be large enough to be easily measured with displacement sensors in that direction, embedded in the structure, including sensors based on the variation of the electrical impedance under the influence of the deformation. Examples of sensors suitable for determining small lateral displacements are also non-coplanar "digital" (also called "comb") capacitive sensors, 19. In a non-limitative version, shown in FIG. 11 (a), one or more non-coplanar comb-type capacitive translators are embedded in the resilient member. At the lateral deformation (by shearing) of the elastic element, the relative position of the digit electrodes changes and thus the respective capacity also changes. As illustrated in FIG. 11 (b), the "comb" electrodes may alternately be positioned on the supports of the structure.

The electrodes of the interdigital capacitors may be coupled with a third electrode with role of dissipative electrode. When the dissipative electrode moves with respect to the plane of the interdigital capacitor, it is changing both the losses of the interdigital capacitor and its capacitance, thus allowing for the measurement of the displacement.

Torsional deformations can be measured according to the invention with planar capacitive impedance sensors, inductive sensors, or comb-type capacitive sensors. In one embodiment, illustrated in FIG. 12 (a), a planar capacitive sensor consists of a substantially rectangular electrode 20 located on one of the supports and two electrodes 21 in the form of a circle segment, placed symmetrically with respect to the first electrode and located on the second support. When the structure is twisted, the capacities between the two electrodes 21 and the electrode 20 become unequal, and their difference is determined by the torsion angle. In another embodiment, illustrated in FIG. 12 (b), an inductive differential sensor is used for torque measurement, where the differential inductive sensor consists of two coils 23 located on one of the supports and placed symmetrically with respect to a third, 22, which is on the other support. When the supports rotate against each other, the coupling inductances between the coil 22 and the coils 23 become unequal, their difference measuring the rotation. In another non-limiting embodiment, illustrated in FIG. 12 (c), the determination of the torque is made with a capacitive impedance sensor "comb" with digital electrodes 24 curved after concentric circles, according to some sectors of circles, arranged in different planes; when the structure is twisted, the areas common to the digital electrodes change and thus the rotation angle is determined by the variation of the capacity.

Figure 12:
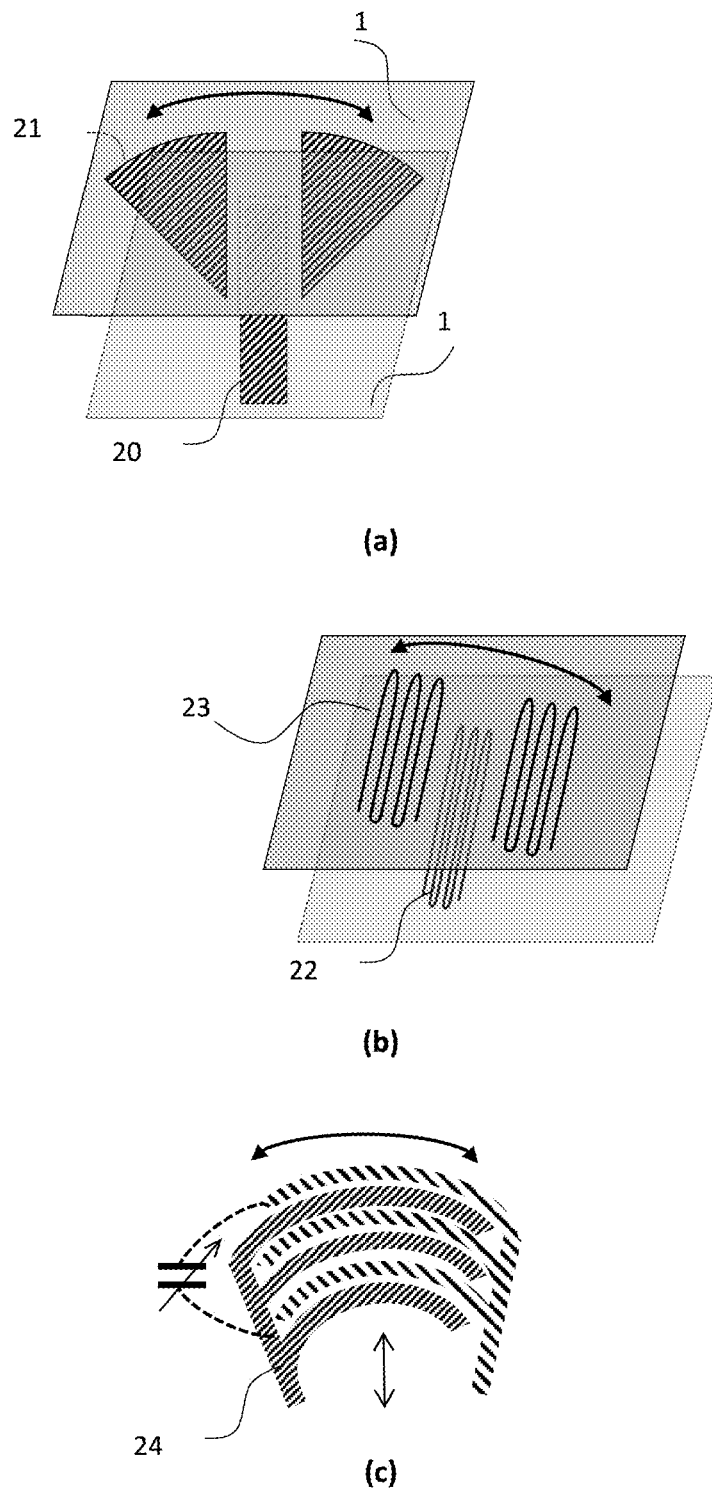
FIG. 12(a), (b), (c)—General sketches of principle of measuring elements for determining torque for (a) differential capacitive impedance measuring element configuration; (b) differential inductive impedance element configuration; (c) a "comb" type capacitive impedance measuring element with angular displacement variation of the capacitance.

Because in the solutions illustrated in FIG. 12 panels (a), (b), (c) the impedance is also modified at tangential and axial displacements, not only at torsion, but the torsion measurements are also made in conjunction with the shear and the compression ones of the structure. Those skilled in the art will appreciate that other variants of impedance measuring elements may be used based on those shown in FIG. 12; for example, instead of the coil 22 of FIG. 12 (b) a magnetic armature in the form of a plate can be used, which differentially modifies the inductors 23, or conductive plates can be used, which will modify differently the losses of the two coils 22 when rotating the upper plate compared to the lower one.

Those skilled in the art will also understand that various other geometries and combinations of impedance elements of various types and shapes and arrangements within the hermetically sealed space, including the mass of the elastic elements, arise from the configurations described and are also subsumed herein. deriving from it and can be used successfully. Similarly, those skilled in the art will appreciate that various combinations of impedance elements with distributed elements R, L, C derive from the description of the invention and may be used in place of impedance elements in which only electrical capacity or inductance dominate. A non-limiting embodiment consists of a large surface winding of the conductive paths and placed near an electrode with which the winding path forms distributed capacities, the assembly having an equivalent distributed LC scheme and making a filter whose characteristic depends on the distance between the electrode and winding.

Also, those skilled in the art will be able to combine in a single sensor various types of measuring elements presented in FIGS. 1 through 12 or measuring elements derived from those figures, where the combined measuring elements measure at least two variables out of the variable: axial forces, tangential forces, and couples in the plane of the supports. Moreover, those skilled in the art will be able to easily convert the described sensors in sensors for linear displacement or angular rotation, using the same techniques as for known force-to-displacement conversion or torque-to-angular conversion.

Figure 8:
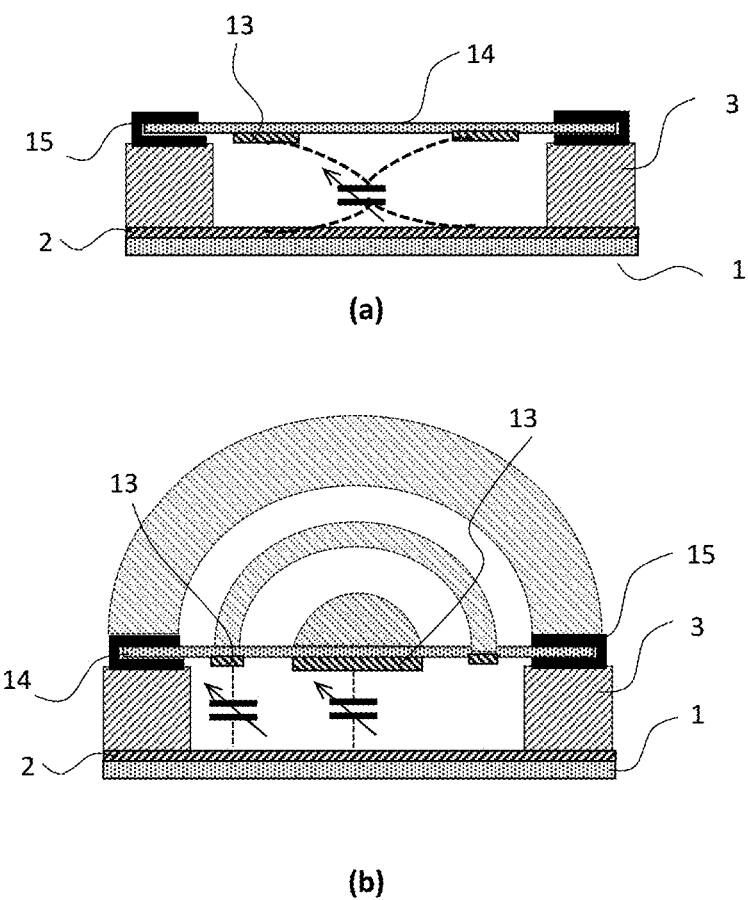
FIG. 8(a) General sketch for capacitive measuring element with capacity between an annular electrode and a ground plane, with the annular electrode placed on a thick dielectric membrane, the membrane having also the role of upper support. (b) Sensor with two capacitive measuring elements, one having an annular and the other having a disc electrode placed on a thick membrane, the two electrodes on the membrane producing with the grounded common electrode 2 the same capacitance at rest position, thus allowing differential measurement of the effect of forces on the membrane.
Figure 9:
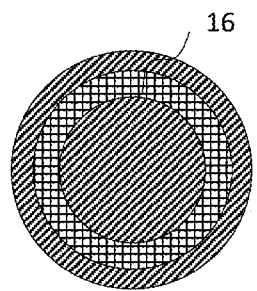
FIG. 9—General outline for mesh screen on an annular area.

In the second type of sensor derived from the structure, which has one of the flexible supports, of the membrane type, described in FIG. 8, the main deformation may be of the membrane, not of the elastic walls, as the walls 3 may be elastic or rigid. In this case, the volume variation of the closed space is relatively smaller, for a displacement (deformation) of the structure comparable to the two types of structures mentioned. Indeed, the typical deformation is approximately after a spherical cap, and if the walls are rigid, the edges of the cap remain in the initial position and the membrane moves a smaller volume of air than the "piston" type case of the displacement of the upper support plane. Instead, the nonlinearity of this structure in travel translators will be greater.

The two types of structures have different properties and behaviors when applying a normal force together with a tangential force. The circular membrane will have an asymmetrical deformation (no axis of symmetry, only plane of symmetry oriented in the direction of the tangential force), while the rigid support will usually take the tangential force, deforming the walls laterally in the direction of the shear force. Therefore, in the case of the membrane, the detection of the tangential force is more difficult, requiring high sensitivity sensors and nonlinearity corrections in all three directions. The use of several measuring elements disposed on the membrane, as illustrated in FIG. 8, permits the compensation of the nonlinearities and the measurement of local deformations. Differential measurements of two or several measuring elements, placed on the membrane as in FIG. 8 or in other manners easy to conceive for those skilled in the art, improve sensitivity and allows the sensor to determine axial and shear forces acting on the membrane.

When a membrane is used, the tangential forces can create large, plastic local deformations in thin membranes, as well as wrinkles; hence the recommendation of using thick enough membranes for avoiding such undesired behavior.

Recommended materials for making elastic walls with good watertightness, with low diffusion of water vapor and at the same time bio-compatible (tolerated on the skin surface and in the body) and at the same time with very good dielectric properties include silicone rubbers—polysiloxane (polysiloxane), with low toxicity, especially silyl-acetates. Silicone materials at the same time have good thermal conduction properties and can be easily transformed with additives to become conductors. The latter property allows the casting or otherwise the formation of insulating elastic walls on the inside and conductors on the outside, for a good shielding of the proposed sensors, the structure can for example be obtained by first casting the insulating inner part and then casting around it the outer part of conductive elastic.

REFERENCES CITED

Patents

U.S. Pat. No. 10,892,229, Hooper, et al., Jan. 12, 2021, Media shield with EMI capability for pressure sensor.
U.S. Pat. No. 10,495,535, Zheng, Dec. 3, 2019, Differential capacitive MEMS pressure sensor and manufacturing method thereof.
U.S. Pat. No. 10,267,700, Teipen, et al., Apr. 23, 2019, Capacitive pressure sensor and method for its production.
U.S. Pat. No. 8,516,884, Stein, et al. Aug. 27, 2013, Shielded prosthetic component.
U.S. Pat. No. 7,171,856, Koike, et al. Feb. 6, 2007 Electrical shield structure for pressure sensor.
U.S. Pat. No. 6,011,477, Jan. 4, 2000, Respiration and Movement Monitoring System, Inventors: Horia-Nicolai Teodorescu; Daniel J. Mlynek.
U.S. Pat. No. 5,986,549, Nov. 16, 1999, Inventor: Horia-Nicolai Teodorescu, Position and Movement Resonant Sensor.
U.S. Pat. No. 4,204,244, Ho, May 20, 1980, Electromechanical pressure transducer.
U.S. Pat. No. 4,157,530, Merz, Jun. 5, 1979, Automatic tire pressure monitoring system.

Non-Patent Literature

C. Giacomozzi and V. Macellari, Piezo-dynamometric platform for a more complete analysis of foot-to-floor interaction, in IEEE Transactions on Rehabilitation Engineering, vol. 5, no. 4, pp. 322-330, December 1997, doi: 10.1109/86.650285.
Satu Rajala, Jukka Lekkala, Plantar shear stress measurements—A review, Clinical Biomechanics, Vol. 29, Issue 5, 2014, Pages 475-483, https://doi.org/10.1016/j.clinbiomech.2014.04.009.
G. Ulisse, F. Brunetti, F. Ricci, A. M. Fiorello and A. D. Carlo, Cross-Bar Design of Nano-Vacuum Triode for High-Frequency Applications, IEEE Electron Device Letters, vol. 33, no. 9, pp. 1318-1320, September 2012, doi: 10.1109/LED.2012.2202367.
W. H. Horton, J. H. Jasberg and J. D. Noe, Distributed Amplifiers: Practical Considerations and Experimental Results, Proceedings of the IRE, vol. 38, no. 7, pp. 748-753, July 1950, doi: 10.1109/JRPROC.1950.233433.
C. A. Hultberg, Neutralization of Screen-Grid Tubes to Improve the Stability of Intermediate-Frequency Amplifiers, Proceedings of the IRE, vol. 31, no. 12, pp. 663-665, December 1943, doi: 10.1109/JRPROC.1943.233682.
R. A. Boie and V. Radeka, High Precision Position Readout for Large Area Neutron Detectors, IEEE Transactions on Nuclear Science, vol. 27, no. 1, pp. 338-350, February 1980, doi: 10.1109/TNS.1980.4330851.
D. Longcope, Capacitance of a sphere near a ground plane—images charges to infinity (Jan. 17, 2019). http://solar.physics.montana.edu/dana/ph519/sph_cap.pdf accesat Apr. 26, 2021.
J. S. Carroll and B. Cozzens, Sphere-gap and point-gap arc-over voltage as determined by direct measurement, Journal of the A.I.E.E., vol. 47, no. 12, pp. 892-896, Dec. 1928, doi: 10.1109/JAIEE.1928.6536816.
F. F. Dall'Agnol, V. P. Mammana, Solution for the electric potential distribution produced by sphere-plane electrodes using the method of images. Revista Brasileira de Ensino de Fisica, v. 31, no. 3, 3503 (2009).
R. A. Boie and V. Radeka, High Precision Position Readout For Large Area Neutron Detectors. IEEE Transactions on Nuclear Science, Vol. NS-27, No. 1, Feb. 1980.
A. Bouteffaha, A. Bendaoud, A. Reguig, L. Dascalescu, Effects of the grid geometry on the performances of a triode-type corona electrode system, Journal of Electrostatics, Vol. 101, 2019, 103367, https://doi.org/10.1016/j.elstat.2019.103367.
H. Teodorescu, Textile-, conductive paint-based wearable devices for physical activity monitoring, 2013 E-Health and Bioengineering Conference (EHB), 2013, pp. 1-4, doi: 10.1109/EHB.2013.6707241.
M. Teodorescu and H.-N. Teodorescu, Capacitive Interdigital Sensors for Flexible Enclosures and Wearables, 2020 International Conference on Applied Electronics (AE), 2020, pp. 1-6, doi: 10.23919/AE49394.2020.9232783.
HNL Teodorescu, Sensors based on nonlinear dynamic systems-A survey. 2017 International Conference on Applied Electronics (AE), Pilsen, Czech R., 1-10.
HN Teodorescu, Model of an adaptive energy harvester with electro-rheological fluid. Proceedings Romanian Academy, Series A 16 (1), 2015, 110-117.

B. Rama Rao, E. N. Rosario, Electro-Textile Ground Planes for Multipath and Interference Mitigation. GNSS Antennas Covering 1.1 to 1.6 GHz, Proceedings of the 24th International Technical Meeting of The Satellite Division of the Institute of Navigation (ION GNSS 2011).

Marter, A., Dickinson, A., Pierron, F. et al. A Practical Procedure for Measuring the Stiffness of Foam like Materials. Exp Tech 42, 439-452 (2018). https://doi.org/10.1007/s40799-018-0247-0

F. Saint-Michel, L. Chazeau, J.-Y. Cavaillé, E. Chabert. Mechanical properties of high density polyurethane foams: I. Effect of the density. Composites Science and Technology, Elsevier, 2006, 66, pp. 2700-2708. ff10.1016/j.compscitech.2006.03.009ff. ffhal-00111453.

Patel P S, Shepherd D E, Hukins D W. Compressive properties of commercially available polyurethane foams as mechanical models for osteoporotic human cancellous bone. BMC Musculoskelet Disord. 2008; vol. 9, 137. Published 2008 Oct. 9. doi:10.1186/1471-2474-9-137.

S. Moore, Encapsulated physical foaming agent targets shoe soles, underbody coatings. Elastomer Foaming Option Expands Application Sphere. Plastics Today, https://www.plasticstoday.com/materials/elastomer-foaming-option-expands-application-sphere. Nov. 3, 2020. Accesed 15 mai 2021.

Z. Horak et al., Experimental Measurements of Mechanical Properties of PUR Foam Used for Testing Medical Devices and Instruments Depending on Temperature, Density and Strain Rate. Materials 2020, 13, 4560; doi:10.3390/ma13204560.

E.M. Lloyd et al., Spontaneous Patterning during Frontal Polymerization. ACS Central Science 2021 7 (4), 603-612. DOI: 10.1021/acscentsci.1c00110

J. A. Pojman, A New Approach to Manufacturing with Frontal Polymerization to Generate Patterned Materials. ACS Central Science 2021 7 (4), 534-535, DOI: 10.1021/acscentsci.1c00341

J. Yang et al., Ultrasoft Liquid Metal Elastomer Foams with Positive and Negative Piezopermittivity for Tactile Sensing.

Yang, J. et al., Ultrasoft Liquid Metal Elastomer Foams with Positive and Negative Piezopermittivity for Tactile Sensing. Adv. Funct. Mater. 2020, 30, 2002611. https://doi.org/10.1002/adfm.202002611.

M. Zadan, C. Chiew, C. Majidi and M. Malakooti, Liquid metal architectures for soft and wearable energy harvesting devices. Multifunctional Materials. 4, 012001, 12 Jan. 2021.

Neumann, T.V. et al., Aerosol Spray Deposition of Liquid Metal and Elastomer Coatings for Rapid Processing of Stretchable Electronics. Micromachines 2021, 12, 146. https://doi.org/10.3390/mi12020146.

R. Tutika et al., Liquid Metal-Elastomer Soft Composites with Independently Controllable and Highly Tunable Droplet Size and Volume Loading. ACS Applied Materials & Interfaces, ACS Appl. Mater. Interfaces 2019, 11, 19, 17873-17883.

The invention claimed is:

1. A sensor for measuring combinations of axial pressure, axial force, tangential forces, and a torque, wherein the sensor has a plane-parallel structure defining a sensor plane and wherein the sensor comprises:
    two essentially parallel plane structural elements that are each capable of taking over an axial pressure or forces and/or tangential forces, and the torques in the sensor plane, wherein the sensor structure has a dimension in a normal direction to the plane-parallel elements smaller compared to dimensions along the plane-parallel elements;
    one or more variable impedancemetric elements, where the impedancemetric elements are characterized by their impedances, operate as sensing elements, and convert deformations of the sensor into a change of impedance of the inpedancemetric elements, wherein said impedances have capacitive, inductive, resistive, or mixed components, with resistive, capacitive and inductive components of said impedances dependent on shape changes of impedancemetric elements, in addition said impedancemetric elements having a frequency dependence that changes when shape changes of the impedancemetric elements occur due to forces or torques applied to the sensor, said frequency dependence being produced by changes in shape, by changes of properties of materials composing the impedancemetric elements or surrounding the impedancemetric elements;
    one or several elastic elements, at least one of which is solid;
    a set of shielding elements that together essentially form a Faraday cage that shields a large volume of the sensor or at least one region inside the sensor, region that includes impedancemetric elements, whereas said shielding elements forming the Faraday cage include discontinuities between the shielding elements and have shapes and arrangements that ensure low values of unwanted couplings between the Faraday cage and the said impedancemetric elements;
    wherein the sensor has a structure comprising parallel structural elements together with elastic element or elements isolating an internal space impenetrable to liquids and gases;
    wherein said structure of the sensor has an axial symmetry;
    wherein the sensor has at least two impedance measuring elements that ensure simultaneous determination of at least two of the following: axial force or pressure, tangential force, and torque in the sensor plane, where the determination is performed by measuring combinations of deformations of the sensor structure under said forces and torque.

2. The sensor according to claim 1, wherein the sensor comprises an elastic element of annular form, or of convex frame form, or of star-shaped polygonal frame form;
    wherein the annular form is located between two plane-parallel supports, sealing together an empty space;
    wherein the sensor includes a set of impedancemetric measuring elements containing active electrodes that create variable measuring capacities with or without variable losses or containing windings that create variable measuring inductances with or without variable losses are completely included in a space delimited on outside by an elastic ring or elastic frame and are embedded inside an elastic element, or are placed partly in a space delimited by internal surfaces of the elastic element and partly in inside of the elastic element, or are fully included inside the elastic element.

3. The sensor of claim 2, wherein the sensor includes one or more measurement impedancemetric elements having a form of interdigital capacitive sensors.

4. The sensor according to claim 2, wherein the sensor includes two or more capacitive interdigital measuring elements, at least one of them said measuring elements having interdigital electrodes arranged in different planes;

wherein the interdigital electrodes move relative to each other when the sensor structure changes;

wherein the interdigital electrodes have spaces between electrode digits greater than a maximum allowable displacement in the normal direction of the digits, wherein the capacitive interdigital measuring elements measure a displacement in a direction parallel to the interdigital electrodes, based on the variation of an electric capacity between the interdigital electrodes and by comparison of that value with the variation of the said capacity when the displacement is in a direction normal to the interdigital electrodes.

5. The sensor according to claim 2, wherein the sensor includes one or more capacitive sensors composed of two electrodes and a dielectric between them;

wherein the sensor has at least one of the electrodes covered with foils or films made of non-hygroscopic insulating materials, and wherein the dielectric has a small dimensional coefficient of temperature and a dielectric permittivity with low temperature coefficient, wherein the dielectric a value of the relative dielectric permittivity significantly greater than 1 (unit).

6. The sensor according to claim 1, wherein the sensor comprises one or more measuring impedance elements, wherein the measuring impedance elements or parts of the measuring impedance elements are placed on the sensor, or are being a component part of the parallel plane structural elements.

7. The sensor according to claim 1, wherein the sensor includes electrical and/or magnetic shielding elements deposited as layers, or as inductive or capacitive networks on of the parallel plane structural elements.

8. The sensor according to claim 1, wherein the sensor has an electrostatic shielding electrode or a conductive magnetic shielding layer placed on a surface of one or of both supports, whereas the electrostatic shielding electrode or the conductive magnetic shielding layer is made in a form of a grid or a mesh, wherein the mesh has a size that ensures a compromise between a shielding effect and values of parasitic capacitances between the shielding electrode or the conductive magnetic shielding layer and active electrodes of the impedancemetric elements.

9. The sensor according to claim 1, wherein the sensor includes a capacitive measuring element where an active, mobile electrode is placed on an inner face of one of the two parallel plane structural elements, wherein the said one of the two parallel plane structural elements constituting a support of the sensor, this support having on its other side a meshed electrostatic shield, wherein the meshed electrostatic shield has a mesh cell of comparable size or greater than the thickness of the support, thus compromising between sensor's sensitivity and nonlinearity.

10. The sensor according to claim 1, wherein the sensor has one of the two parallel plane structural elements made of a thick membrane that deforms asymmetrically when submitted to both axial and shear forces, wherein one or more impedancemetric measurement elements have an active electrode for capacitive elements or a magnetic core or winding for inductive measuring elements placed on an inner face of a membrane-like parallel plane structural element, whereas several such measuring elements are jointly used to correct nonlinearities in measurement and for discriminating and determining between axial and shear stresses, whereas the dimension and spatial distribution of the measurement elements is chosen such that to ensure a compromise between an overall sensitivity of the sensor, a nonlinearity of the capacitive sensor and a capacitance value with the shielding electrode.

11. The sensor according to claim 1, wherein the sensor has one or more capacitive elements with the passive electrode connected to ground and arranged on the membrane which takes over the pressure or force and by deformation changes the value of the measuring capacity, the passive electrode being made in the form of bands with variable distance between bands or with variable width of bands or with distance between bands and width of variable bands, whereas the values of the said widths and distances between bands determine the sensor sensitivity and nonlinearity.

12. The pressure sensor according to claim 1, wherein the sensor comprises either;

one or more capacitive elements with passive electrodes connected to ground and positioned on a membrane that takes over external forces, whereas deformations of the membrane change a measuring capacitance, or one or more ferromagnetic patches placed on a membrane, each one patch serving as magnetic core to an inductive measuring element, and wherein the use of several such measuring elements allows a determination of the deformations of said membrane and thus, indirectly, determination of the forces acting on said membrane.

13. The sensor according to claim 1, wherein the sensor has one or more flat inductors which, by changing their mutual inductance and inductances when changing their shape under the action of external forces and, possibly, simultaneously by modifying a parasitic capacity between the inductors, ensures detection and measurement of the sensor deformation.

14. The sensor according to claim 1, wherein the sensor has a deformable membrane of low thickness and high elasticity on which is placed at least one passive electrodes so that at least one electrical capacitance is sensitive to small variations in external air pressure whereas small variations in external air pressure may be produced by elastic waves.

15. The sensor according to claim 1, wherein the sensor comprises one or more measuring inductors and one or more elastic elements that comprise materials with magnetic properties, wherein the materials comprise inclusions of ferrite, magnetic metal powders, or combinations thereof, so that when the sensor is deformed the measuring inductors change their inductances.

16. The sensor according to claim 1, wherein the sensor has elastic walls formed of two layers of elastic material, wherein one of the two layers is an insulator, while the second one is conductive and forms an electrical screen, the conductive layer being connected to an electrode or a ground contact.

17. The sensor according to claim 1, wherein the sensor has elastic walls formed of one or more conductive layers arranged so as to constitute an electrical shield and to connect to an electrode or a ground contact.

18. The sensor according to claim 1, wherein the sensor has an elastic element or elements made of a non-uniform elastic material in the form of elastic foams, whereas said non-uniform elastic material has closed air inclusions (cellular structure), with a compact structure toward the outside surface of the sensor, while being in the form of spongy or cellular foam toward the inside surface of the sensor.

19. The sensor according to claim 1, wherein the sensor has at least one elastic element consisting of an elastic material with variable properties in the sensor's structure, made by frontal polymerization or other similar method.

20. The sensor according to claim 1, wherein the sensor includes an electric generator which collects mechanical energy from external forces, torques and pressures exerted on the plane-parallel structural elements and converts it into electrical energy for supply internal sensor circuits.

21. The sensor of claim 1, wherein the sensor is provided with annex circuits that measure the impedancemetric elements at least at two different frequencies, the said circuitry performing determination and computation of impedances of the impedancemetric measurement elements and, at the same time, correct errors produced in a single determination of the impedances, the said circuitry further performing the computation of the pressure, forces, and/or torques.

\* \* \* \* \*